United States Patent
Wolinsky et al.

(10) Patent No.: US 7,297,969 B1
(45) Date of Patent: Nov. 20, 2007

(54) WEB MARKING AND INSPECTION SYSTEM

(75) Inventors: Jeffrey Wolinsky, Oakland, CA (US); Markku Jaaskelainen, Sudbury, MA (US)

(73) Assignee: Cognex Technology and Investment Corporation, Mt. View, CA (US)

(*) Notice: Subject to any disclaimer, the term of this patent is extended or adjusted under 35 U.S.C. 154(b) by 220 days.

(21) Appl. No.: 10/457,206

(22) Filed: Jun. 9, 2003

(51) Int. Cl.
*G06K 7/00* (2006.01)

(52) U.S. Cl. .................. 250/548; 250/559.44; 235/436

(58) Field of Classification Search ................ 250/559, 250/559.4, 559.44, 559.04, 548; 400/611; 235/436
See application file for complete search history.

(56) References Cited

U.S. PATENT DOCUMENTS 6,170,747 B1 * 1/2001 Meyer ........................ 235/436
6,725,123 B1   4/2004 Denuell

OTHER PUBLICATIONS

"iWinder", *Isys Technical Product Bulletin*, Cognex Corporation, (Aug. 1996).
"iWinder", *Technical Manual*, Cognex Corporation, (1998).

* cited by examiner

*Primary Examiner*—Thanh X. Luu
*Assistant Examiner*—Tony Ko
(74) *Attorney, Agent, or Firm*—Michael A. Jaskolski

(57) ABSTRACT

A method and apparatus for use with a web of material having a web length dimension and a web surface, the method for placing mark sequences on the web surface every X distance along the web length dimension identifying location along the web length dimension, the method comprising the steps of monitoring web location, every X distance, placing a sequence of N marks on the web surface along the web length wherein each two adjacent marks define a space length dimension and wherein the pattern of space length dimensions formed by the N marks in the sequence together specify a specific web length location. The invention also includes a marking and defect locating system including a high speed printer and a high resolution, high speed camera to facilitate the methods.

32 Claims, 5 Drawing Sheets

WEB MARKING AND INSPECTION SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The field of the invention is web inspection systems and more specifically a system for encoding web (continuous) material with position information that can later be used to rapidly and precisely identify locations of interest on the web and performs some action based on those locations.

Hereinafter, while the present invention is applicable to various types of web materials and systems used to manufacture, process and repair such materials, unless indicated otherwise, the invention will be described in the context of paper manufacturing and systems used to locate and repair defects in large rolls of paper.

To meet the every increasing demand for paper products, the paper industry is constantly searching for ways to reduce costs and increase efficiencies of paper production. As in other industries, one way to reduce costs appreciably in the paper industry is to adopt mass production procedures. A paper manufacturing machine can rapidly produce extremely long (e.g., tens of miles) continuous ribbons of paper or webs. To store and handle these massive paper webs, a spindle (dowel) is mounted on a wind-up device, the leading end of the web is attached to the spindle and the spindle is wound at a high rate to take up slack in the web as the sheet emerges from an outlet end of the paper manufacturing machine. A paper web and associated spindle are referred to hereinafter as a reel.

After a complete reel (i.e., a full spindle) has been wound, the following end of the web is cut, the reel is removed from the wind-up device, a second spindle is mounted to the wind-up device and the process is repeated. Full reels are taken for further processing, by the paper manufacturer, or by end users (e.g., large printing companies, newspaper publishers, etc.). For this further processing, the reels are mounted on an unwind device that feeds a finishing machine, including paper coaters, patch and splice un-reelers, slitters, sheeters, folders, printing presses, etc.

Great effort has been exerted to minimize the number of manufacturing defects in paper webs like those described above. Nevertheless, a reel typically includes at least a small number of paper defects (e.g., 5-30 per roll) including holes, foreign objects, discolorations, edge tears, cracks, etc. At first blush, the small number of defects per reel may not seem troublesome, however, upon a more detailed perusal of paper processing and usage, it becomes apparent that even a small number of defects cannot be tolerated in many applications.

Perhaps the most important reason defects cannot be tolerated is that defects can cause finishing machines to malfunction. In this regard, as well known in the industry, even a small defect can, when subjected to the strains associated with high speed unwinding and other finishing activities, lead to an enlargement of the defect, the production of other defects, and even complete sheet breaks (a break in the web). When a sheet breaks, a large amount of sheet material is typically damaged as a large spinning unwind device typically takes a long time (e.g., minutes) to stop rotating and web material shoots off the reel during the slowing process. In addition, such breaks usually result in finishing machine downtime as the unwind device has to be stopped, scrap material has to be removed and discarded, the finishing machine line must be re-threaded and the finishing process has to be restarted.

One common method for dealing with paper defects is to identify and repair defects before they might impact further processing stages or compromise end-user quality standards. For example, an exemplary inspection system may include an inspection camera or cameras positioned between the output end of a paper manufacturing machine its wind-up device. The camera produces images of the complete area of paper manufactured and provides those images to an inspection processor. The inspection processor is programmed to identify defects in the received images. When a defect is identified, the inspection processor stores an indication of the defect type correlated with defect location along the web (hereinafter a "defect/location pairing") in a database.

After a reel is full, the reel is removed from the wind-up device and mounted on the unwind device of another machine, a repair machine, with the free end (i.e., the following end) of the web linked to another wind-up device. The unwind and wind-up devices of the repair machine and the are controlled to unwind and rewind the paper web. The paper web can be stopped periodically to expose a defect or defect region for repair (e.g., a defect may be spliced out and a patch melded in its place). After a defect is repaired, the unwind and wind-up devices are again advanced until the next defect or region is exposed and can be repaired. After all defects are repaired, the remainder of the web is wound on the machine's wind-up spindle to form a complete reel and then the reel is removed and sent for further processing.

While inspection and repair systems like the one described above can yield reels free of critical defect, several difficulties have to be overcome in order to run such a system efficiently. In particular, to avoid a manufacturing bottleneck effect at a facility, the process of advancing between defects has to be rapid and stopping at defects must be precise. Overshooting or undershooting by a even a small amount can hide a defect and cause consternation as a system operator is forced to manually drive the system forward and backward to locate the defect. Advancing slowly between defects increases the time required for repair appreciably.

High speeds are not a problem as large motor systems are capable of rapidly accelerating even full reels to speeds of 8,000 feet per minute or more. Precisely stopping to expose a defect for repair, however, has proven to be more difficult. When a large paper reel is rotated at high speed, rotating momentum has to be overcome to stop the reel and the time required to stop the reel may be several minutes and may require several thousand reel rotations. Also, the paper must be accelerated and decelerated slowly (gently) to avoid ripping or deformation. Thus, the location of a defect has to be known well in advance of the defect being exposed in order to stop a rotating reel precisely for repair (e.g., so that the defect is exposed).

One solution for providing advanced warning that a defect is coming is to apply marks on the paper web that, upon unwinding, appear prior to the defect and that can be sensed to indicate that deceleration should commence. One particularly useful type of marking machine is positioned between a paper manufacturing machine's output and its wind-up device (e.g., proximate the inspection camera or cameras).

The marking machine is linked to the inspection processor and provides "absolute position" mark sequences on the surface of a web and proximate a web edge as the web passes by. As the label implies, each absolute position mark sequence identifies a specific location along the length of the web. A typical mark sequence may include a series of marks that together form a code that can be readable at high speeds.

A processor at the repair machine, the repair processor, is programmed with an algorithm for de-coding the mark sequences to identify absolute web locations and is linked to access the defect/location pairings (i.e., the pairings stored by the inspection processor). The repair processor is also programmed with a stopping algorithm that can determine the typical slowing and stopping requirements of the machine, based on the current condition of the rotating reel (e.g. speed and acceleration). Specifically, the stopping algorithm attempts to predict the distance of web that would pass (be unwound) from the time a normal (non-emergency) slowing and stopping process commences until the web on the repair machine comes to a complete stop. For instance, the algorithm might calculate that slowing and stopping from a constant speed of 6,000 feet per minute should result in 7,000 feet of web being transported. In addition, the repair processor can commence processes to slow and stop the repair machine.

In addition to the components described above, the repair system also includes a camera or cameras linked to the repair processor and positioned between the unwind and wind-up devices of the repair machine to examine the mark sequences as the web is unwound for repair. The camera(s) provides images of the web near the edges to the repair processor which in turn identifies the mark sequences, decodes the sequences and thereby identifies location along the web length.

Having access to the defect/location pairings, being able to determine current web location and being programmed with the stopping algorithm, the repair processor should be able to precisely and efficiently stop the unwinding process to expose defects for repair. For example, assuming 7,000 feet are required to stop a high speed reel, the processor can be programmed to commence a stopping process when a mark 7,000 feet before a defect/location pairing is identified.

Unfortunately, while the system described above works well in theory, in reality there are several shortcomings. First, because of perceived hardware constraints, the industry has generally used relatively long marks to form mark sequences. For instance, an exemplary shortest possible mark in many cases is one or more yards long and may be ½ inch or more wide. While readily identifiable as a mark by many different types of camera systems, one or more yard long and relatively wide marks require excessive amounts of ink to produce and hence are costly. In addition, wide and long marks take up a relatively large amount of paper surface area and hence reduce the amount of paper useable by end users.

Second, marking hardware has some shortcomings that limit the characteristics of marks that can be uniquely distinguished with an acceptable degree of certainty. As known in the industry, mark making machines typically apply marks by spraying ink onto a surface of the paper web. While the beginning of a mark application is relatively precisely controllable (e.g., the turn on instant of a mark is controllable), the process of stopping mark application or turning off the mark sprayer is not very precise and, as a result, the ends of marks often "dribble" on past the points intended. This dribbling results in an unintended tailing effect. Hereinafter the unintended section of a mark will be referred to as a mark tail.

Because of the tailing effect, the differential between lengths of marks intended to indicate different information must be greater than the longest expected mark tail and the spaces between marks must also be greater than the longest expected mark tail. Thus, for instance, where an expected longest dribble or mark tail is 0.90 yards, the differential between marks intended to have different lengths that can be sensed has to be greater than 0.90 yards. Here, where a minimum mark length is 1 yard and numbers from 0 to 9 are to be represented by different length marks, the longest mark will have to be approximately 10 yards. Where value 9 is represented by a 10 yard mark, the value 999 may be encoded using a first ten yard mark (e.g., the first 9), a one yard space, a second ten yard mark (e.g., the second 9), a one yard space and a third ten yard mark (e.g., the third 9) so that the total length of the exemplary mark sequence associated with value 999 requires 32 yards.

Third, because of the length required to generate even a simple uniquely distinguishable mark sequence and the ink costs associated with such marks, most marking systems are limited to a small number of different mark sequences (e.g., 1000) and the space between marks equi-spaced along a multi-kilometer long web may be 1000 or more yards. Here, locations between mark sequences (i.e., intra-mark locations) have to be determined in some other fashion.

One way to identify intra-mark locations has been to provide an encoder on a roller proximate the repair machine unwind device that generates signals indicating roller velocity usable to determine web length travel from the most recent mark sequence. The web length travel is added to the location associated with the most recent mark sequence to determine instantaneous intra-mark location. Unfortunately, an encoder may not accurately measure the actual web movement, for a variety of reasons. For example, the web material may slip relative to the encoder's roll, the encoder may not be properly calibrated, and/or the material may shrink or stretch. Over a distance of 1000 yards or more, small errors may accumulate, resulting in a positional inaccuracy of several yards, yards causing the repair controller to stop the repair machine prior to or subsequent to desired defect exposure.

Fourth, when a reel of paper is first mounted on a repair machine, the material location is unknown until the first mark sequence is read. It is difficult to estimate the material location for numerous reasons: operators cut wraps of paper off the reel (e.g. to take samples for testing, to clean up the tail of the reel, or to prepare for threading), an unpredictable amount of material is transported during threading, etc. Thus, in cases where there is a great distance between mark sequences, it can potentially take a significant movement of web material before the first mark sequence is detected and decoded. This in turn can cause inaccuracies and failures when attempting to stop at a defect in the first portion of a reel that is being unwound.

Fifth, there are instances where a web breaks during the unwinding repair process and has to be repaired. Often to repair a web break, some paper material has to be discarded and hence the distance along a repaired web from the most recent location mark sequence is imprecise. To re-synchronize, the repair processor has to wait until the next location mark sequence is encountered and successfully read. In this case, the locations of defects prior to the next mark sequence (e.g., prior to re-synchronization), if any, cannot be precisely determined from the mark sequences and, in some cases, may not be repaired.

Sixth, despite efforts to apply clear and precise marks, sometimes marks are misapplied or misread. For instance, assume a sequencing system where a one yard mark corresponds to a zero, a two yard mark corresponds to a one and so on up to a ten yard mark corresponding to a 9. If the mark sprayer machine fails to apply ink (e.g., sputters) during a central section of a ten yard mark corresponding to a 9 value, the resulting two marks may be read as a 3 and a 4 (e.g., where the first mark is four yards long, the second mark is five yards long and the sputter accounts for a one yard space). Many other errors due to a sputtering mark sprayer machine are contemplated. Where errors of this type occur, in some cases, the repair processor may not be programmed to recognize the errors and incorrect control may result. In the alternative, some processors have been programmed to recognize mark sequences that are not supported by the system and to disregard the data related thereto. Where mark sequences are disregarded, the processor simply waits for the next mark sequence to relocate and, in the interim, may use encoder information to roughly determine location for control purposes. Here until a valid mark sequence is again read, imprecision is compounded.

Seventh, upon commencing reel advancement from one defect to another, prior known systems have tied commencement of the stopping process to velocity and distance (e.g., web length) to next defect. To this end, prior systems have recognized that, just as a reel spinning at a top speed or velocity requires a specific web length of unwinding to stop, intermediate speeds also require specific web lengths of unwinding to stop. For instance, if a reel spinning at a top speed of 6,000 ft./min. requires 7,000 feet of unwinding to stop, a reel spinning at 5,000 ft./min. may require 5,500 feet of unwinding to stop, reels spinning at 4,000 ft./min. may require 4,700 feet of unwinding to stop and so on. In some systems these velocity-required web length pairings are stored for use during unwinding. Here, upon commencing advancing movement toward a next defect, the top speed command signal is used to drive the reels and mark sequences and encoder data are used to identify current web length location and the web length to the next defect. In addition reel velocity is tracked and, when a web length paired with a stored reel velocity is equal to or less than the web length to next defect, the stopping process is started. For instance, consistent with the example above, where the reels are spinning at 4,000 ft./min and the web length to next defect is 4,700 feet the stopping process is commenced.

While systems like the one described above work well in theory, in reality such systems have important shortcomings. In particular, the assumption that there is a one to one pairing between reel velocities and web lengths required to stop is not completely accurate. Here, it should be sufficient to note that stopping length may depend on current acceleration as well as velocity. Thus, for instance, a reel rotating at a steady state 5,000 feet per minute may require less stopping length than a similar reel at 5,000 feet per minute that is accelerating at a high rate. Similarly, a full reel will typically require more stopping length than a half reel.

One way to deal with the shortcomings described above has been to adopt stopping algorithms that include some leeway for errors (i.e., a "fudge factor") and that drives the reels at two different velocities. For instance, in the example above, where a high speed reel (e.g., 6,000 ft./min.) requires 7,000 feet of unwinding to stop, the stopping algorithm may be set to commence stopping at 7,500 feet. After a reduced velocity (e.g., at 500 ft./min.) is achieved (e.g., at 800 feet prior to the defect) the algorithm may maintain the reduced velocity until the defect is exposed.

Here, because of the location uncertainties described above, prior systems have required a relatively large fudge factor and hence a relatively long time to decelerate and stop proximate a defect. In addition, despite providing an encoder, these systems have been known to miss their target (i.e., the defect) by several yards thereby requiring a system operator to manually hunt for defects and thus further increasing the overall time required to find each defect.

While each individual process of locating and exposing a defect may not appear too burdensome, when a reel includes many (e.g., 30) defects, the cumulative additional time required to expose the defects is appreciable. Moreover, the enhanced stopping algorithms do not address the re-synchronization problems associated with web breaks described above.

BRIEF SUMMARY OF THE INVENTION

It has been recognized that a new type of mark sequence can be used to provide absolute web length location sequences at relatively close web length locations. For instance, instead of providing a sequence every 1,000 yards, now absolute web length location sequences can be provided every 10 yards. Many advantages are derived from having relatively close mark sequences. For instance, stopping on defects (i.e., to expose defects) is much more accurate as the inaccuracies associated with web elasticity are negligible along web lengths on the order of tens of yards. As another instance, the time to start a stopping process can be identified with much more certainty and hence the fudge factor can be reduced appreciably. As one other instance, the web length require to re-synchronize web location is reduced to the length between consecutive mark sequences (e.g., 10 yards or less) which, in almost all cases, will mean that resynchronization can be achieved prior to the next defect location. Even if a next defect occurs prior to a next mark sequence, the reverse hunting process to expose the defect is simple and would require only a short amount of time.

According to at least some embodiments of the invention, instead of relying on mark lengths in sequences to encode absolute position information, spaces formed by marks are employed to encode position information. More specifically, it has been recognized that the inaccuracies associated with mark tails can be completely avoided by using the spaces defined by the starting points of consecutive marks to encode data. Here, because starting points of marks can be precisely controlled (as compared to the ends of marks which tend to tail off as described above), spaces defined by the points can likewise be precise.

In addition, it has been recognized that an inkjet printer (e.g., continuous, impulse, drop-on-demand and variations such as wax-based impulse, gravity-feed, etc.) or laser marking printer (i.e., burning) can be employed to make relatively short and thin marks that are individually distinguishable via a suitably configured high speed and high resolution camera. Here, for instance, each mark may be on the order of one inch long and spaces between marks may be on the order of one to six inches long and marks may be on the order of 1 mm wide.

Moreover, it has been recognized that the number of independently markable web length locations can be increased appreciably by coding with spaces that indicate binary information. For instance, in some embodiments, each space defined by consecutive mark starting points may be one of four distinct lengths, correspondingly representing four values (0, 1, 2, or 3) Hence, each space corresponds to two bits of data (00, 01, 10, or 11). Thus, where consecutive mark starting points define twelve separate spaces (i.e., the sequence includes 13 marks), a total of 24 bits of data can be encoded by each sequence and literally hundreds of thousands of distinct sequences can be generated.

Consistent with the comments above, the invention includes a method for use with a web of material having a web length dimension and a web surface, the method for placing mark sequences on the web surface every X distance along the web length dimension identifying location along the web length dimension, the method comprising the steps of monitoring web location and, every X distance, placing a sequence of N marks on the web surface along the web length wherein each two adjacent marks define a space length dimension and wherein the pattern of space length dimensions formed by the N marks in the sequence together specify a specific web length location.

According to one aspect, each mark may begin at a mark start point and wherein the space length dimension defined by each two adjacent marks includes the dimension between the start point of a first of the two adjacent marks and the start point of the second of the two adjacent marks. In some cases N may be at least two but in other cases N may be greater (e.g., 6, 13, etc.). In some embodiments the ratio of the longest to the shortest space length dimensions is less than two. In some embodiments each space length dimension is a space dimension range and wherein the space dimension ranges are completely distinct. In some cases the space dimension ranges include four separate space dimension ranges and each space dimension range indicates four values or two bits of information. Here, the longest acceptable length in the longest space dimension range may be less than twice the shortest acceptable length in the shortest space dimension range. For example, the space dimension ranges may include first, second, third and fourth ranges between approximately 3.75 and 4.25 inches, 4.75 and 5.25 inches, 5.75 and 6.25 inches and 6.75 and 7.25 inches, respectively. In some cases each mark is between $1/50^{th}$ inch and five inches and each space length dimension is greater than the longest mark length dimension. In some embodiments each mark is between one inch and 2 inches and each space length dimension is between 3 inches and 8 inches and each (variable-length) mark sequence is less than 5 yards. X is sometimes less than 20 yards. In some cases mark lengths may be as short as $1/50^{th}$ of an inch.

In some embodiments the method is also for, subsequent to placing mark sequences on the web surface, identifying locations along the web surface via the mark sequences, the method further including the steps of while unwinding the web, examining the mark sequences and, for each sequence identifying the space length dimension pattern corresponding to the sequence and using the space length dimension pattern to determine location along the web length.

In some cases the step of placing the marks includes using a high speed printer to place the marks and the step of examining the mark sequences includes providing a high speed, high resolution camera to sense the marks. Here, the high speed printer may be one of an ink jet printer and a laser marking (i.e., burning) printer. Other high speed non-contact printers are contemplated that are capable of placing a distinct mark of less than one foot in length and typically one or two inches in length on a web that is moving at speeds in excess of 500 feet per minute and sometimes as high as 8,000 or more feet per minute. Here, an important limitation is some embodiments is that, whatever type of printer or marker is employed, the printer be capable of turning on and off at an extremely high rate to provide at least 1000 separate and distinct marks per minute. In some cases at least 1500 marks per minute may be required while in other cases 3000 marks per minute may be required.

Consistent with the above comments, some of the embodiments of the invention also includes a method for use with a web of material having a web length dimension and a web surface, the method for placing marks on the web surface identifying location along the web length dimension, the method comprising the steps of providing a printer capable of generating at least 1000 separate marks per minute moving the web material past a marking station at a rate of at least 500 feet per minute, monitoring web length location, using the printer to place marks on the web surface along the web length wherein the marks indicate an associated web location. Here, the step of using the printer may include using the printer to place mark sequences on the surface along the length wherein the sequences indicate web location.

The step of using the printer may include placing a sequence every X distance where each sequence includes N marks and each sequence is less than twenty yards long. Each mark sequence may be less than five yards long and X is less than 20 yards. In some embodiments the printer may generate at least 1500 separate marks per minute and in others the printer may generate at least 3000 separate marks per minute.

Moreover, the invention also includes an apparatus for use with a web of material having a web length dimension and a web surface, the apparatus for placing mark sequences on the web surface every X distance along the web length dimension identifying location along the web length dimension, the apparatus comprising a processor for monitoring web location and a high speed printer for, every X distance, placing a sequence of N marks on the web surface along the web length wherein each two adjacent marks define a space length dimension and wherein the pattern of space length dimensions formed by the N marks in the sequence together specify a specific web length location.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

A. Hardware

Figure 1:
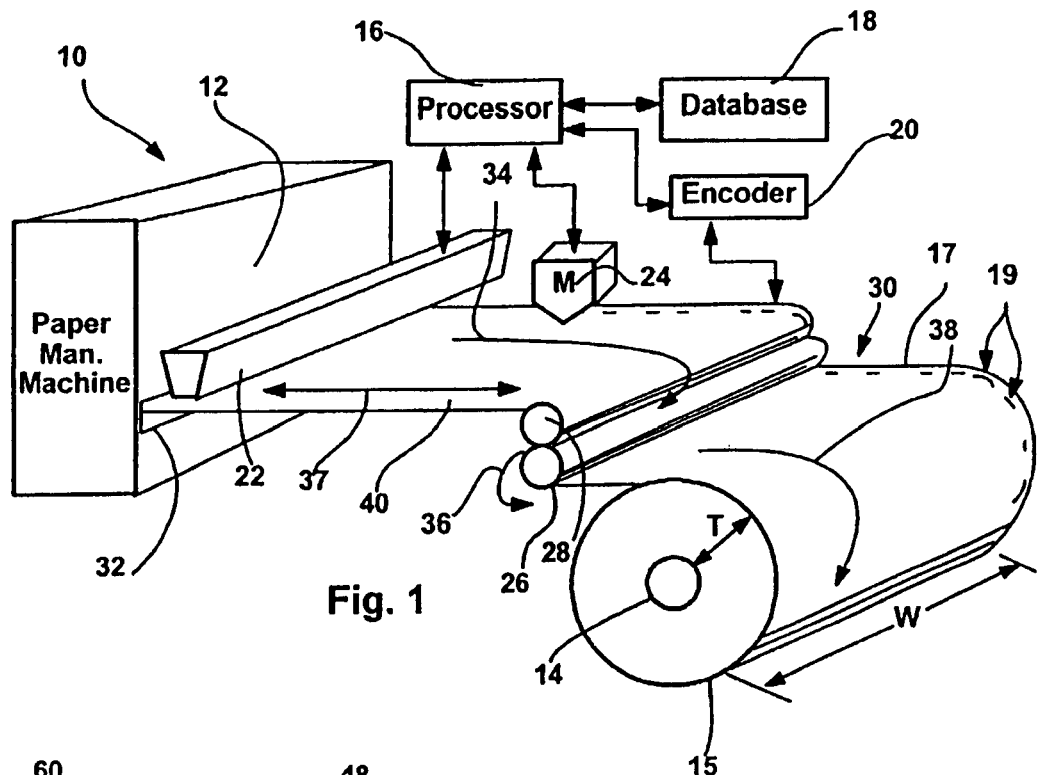
FIG. 1 is a schematic diagram illustrating a paper manufacturing machine, inspection system, web marking assembly, and wind-up device according to the present invention.

Referring now to the drawings wherein like reference numerals correspond to similar elements throughout the views and, more specifically, referring to FIGS. 1 and 2, the present invention will be described in the context of a paper manufacturing system including first and second assemblies 10 and 60, respectively. In general, first assembly 10 produces a large reel of paper 15 including absolute web location mark sequences (two exemplary marks identified by numeral 19) where reel 15 has a width dimension W and a thickness dimension T. Assembly 60 is provided to unwind a full reel 15 that includes mark sequences, identify locations of web defects and stop the unwinding process at each defect thereby exposing the defect for repair.

Referring to FIG. 1, to produce web 40 with the mark sequences thereon, assembly 10 includes a paper machine 12, a wind-up device spindle 14 for receiving the paper web 40, a processor 16, a database 18, an encoder 20, encoder rollers 26 and 28, an inspection camera 22 and a marker device 24.

Manufacturing machine 12 includes a paper outlet port 32 and, as its label implies, outputs web 40 through port 32. Encoder rollers 26 and 28 are spaced from outlet port 32 thereby forming an inspection and marking space 37. Rollers 26 and 28 are mounted to be parallel to web width W and, in the illustrated embodiment, so that roller 26 is below roller 28 with a narrow space therebetween. Winding spindle 14 is positioned proximate roller 26 and is also parallel to web width W. A leading end of web 40 is fed from port 32 around encoder roller 28, between roller 28 and roller 26 and to spindle 14 where the leading end is attached. In operation, as web 40 emerges from port 32, web 40 travels in the directions indicated by arrows 34, 36 and 38 and is wound on spindle 14 to form reel 15.

Web 40 is taut between port 32 and spindle 14 and there is very little slippage between roller 28 and web 40. Thus, as roller 28 rotates, at least over short distances, there is generally to one-to-one relationship between roller rotation and web length advance (e.g., when roller 28 rotates once, web 40 advances a distance essentially equal to the circumference of the roller 28). Encoder 20 senses roller 28 rotation and provides an encoder signal to processor 16. Processor 16 uses the encoder signal to, at least over short web distances, precisely determine the web length passing by roller 28.

Inspection camera 22 is generally a high speed, high resolution elongated line camera which extends across web width W and is positioned proximate output port 32 of machine 12 and on a top side of web 40 in inspection and marking space 37. As well known in the art, camera 22 generates images of web 40 as web 40 exits port 32 and provides the image data to processor 16.

Marker device 24 is positioned next to camera 22 within inspection and marking space 37 and so that a marker spray head (not illustrated) is slightly offset from a lateral web edge 17. In at least some embodiments marker device 24 is a high speed printer capable of producing relatively short distinct marks on the web surface while the web is moving at high speeds. For instance, while the web is moving at 6,000 feet per minute, marker device 24 may have to be capable of applying marks of approximately one inch length to the web surface. Minimal marker device capabilities may require a device that can apply at least 1000 separate marks per minute. In some cases 1500 or 3000 marks per minute may be required. Known conventional web marking devices are not capable of such functions. Exemplary high speed printers may include various types of ink jet printers (e.g., continuous, impulse, drop-on demand, etc.), laser markers or any other printers having the required fast mark applying capabilities that are contemplated. Marks generated by device 24 are, in at least some embodiments, relatively thin (e.g., on the order of $\frac{1}{50}^{th}$ of an inch in width). In some embodiments, device 24 must be capable of generating marks with clearly defined starting points so that, when turned on to provide a mark, device 24 goes on essentially instantaneously. In embodiments where space lengths defined by consecutive marks as opposed to mark lengths are used to code web length locations, marker device 24 need not be able to precisely define the tailing ends of marks and instead, may generate marks having mark tails within a range up to a known maximum length.

Referring still to FIG. 1, in addition to being linked to camera 22 and encoder 20, processor 16 is also linked to marker device 24 and database 18. In addition to other functions, processor 16 performs three functions that are important to the present invention. First, processor 16 uses encoder signals from encoder 20 to continually track the web length location at which roller 28 resides. For example, if 3,000 yards of web material have already accumulated on reel 15 and the distance between roller 28 and reel 15 is 4.5 yards, processor 16 generates an instantaneous web length location signal indicating 3,004.5 yards Second, processor 16 is programmed to examine the image data generated by camera 22 and identify any defects that occur in web 40. To this end, when properly illuminated, virtually all web defects show up as either a light spot or a dark spot in image data generated by camera 22 and therefore can be distinguished form non-defective web material. Many web inspection algorithms have been developed within the industry and any of the those algorithms may be used here. Typical defects include holes, dirt, water drops, oil drop, streaks, scratches, edge cracks, coating skips or voids, wrinkles, caliper tears, calendar cuts, scabs and edge tears.

When processor 16 identifies a defect, processor 16 correlates a web length location with the defect and stores the correlated location and defect information in database 18. For instance, if a defect is identified at the instant when a web length location corresponding to data from encoder 20 is 3,000 yards and there are 6 yards between roller 28 and the position of camera 22, processor 16 correlates the web length location 3,006 yards with the defect and stores the correlated information in database 18. In addition to storing an indication that a defect occurred along with a location, processor 16 may also store other information such as the type of defect, the position along web width W at which the defect occurred, etc.

Figure 3:
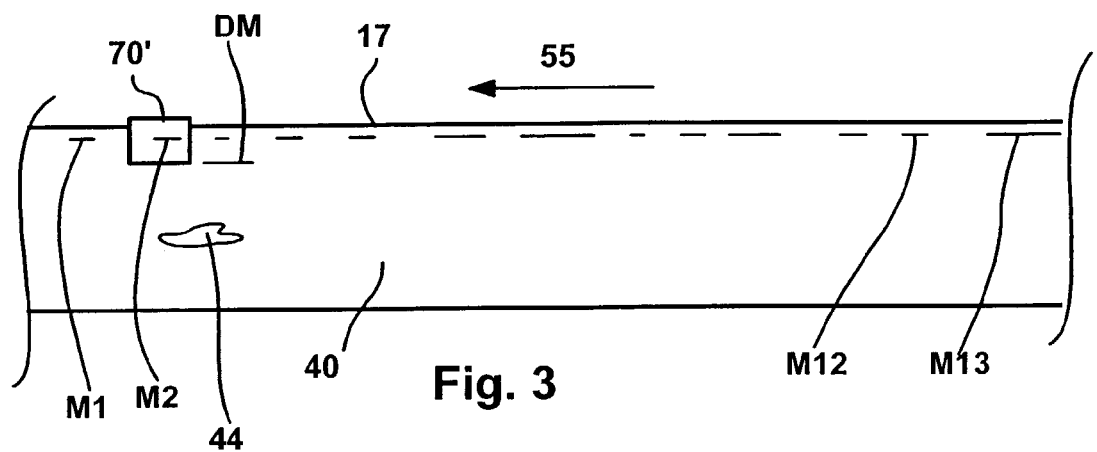
FIG. 3 is a schematic top plan view illustrating a segment of the web of FIG. 1 and showing a 13-mark sequence according to one aspect of the present invention.

Third, processor 16 is programmed to control marker device 24 to apply mark sequences in a precise fashion to identify equispaced absolute web length locations. Thus, as encoder 20 generates web length location data, processor 16 causes marker device 24 to apply corresponding mark sequences to the surface of web 40. In a similar fashion, processor 16 may cause marker 24 to apply a "defect mark" along edge 17 at a location corresponding to the web length at which a defect occurs. A defect mark will typically have an appearance similar to that of a mark in one of the absolute position sequences but may be offset a different distance from the web edge 17. In this regard, FIG. 3 illustrates an exemplary mark sequence including 13 separate marks M1, M2 . . . M12 and M13 proximate edge 17 and an exemplary defect mark DM on a side of the mark sequence opposite edge 17 and at a web length location corresponding to a defect 44. Defect marks (e.g. DM) maybe used to provide visual feedback to an operator or to assist in automatic stopping.

Figure 2:
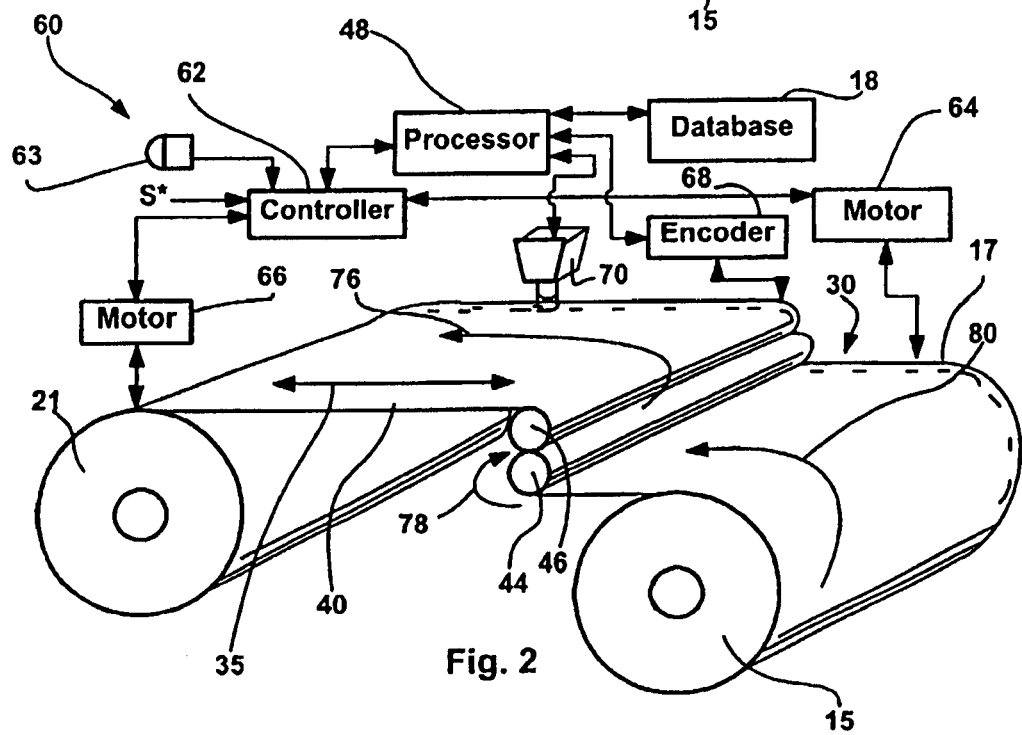
FIG. 2 is a schematic illustrating a repair machine assembly according to the present invention.

Referring now to FIG. 2, to rapidly and precisely unwind reel 15 and stop web advance to expose defects, assembly 60 includes a "downwind" reel 15 to be unwound, an exemplary receiving or "upwind" reel 21 which is wound while downwind reel 15 is unwound, first and second encoder rollers 44 and 46, a processor 48, database 18, a controller 62, first and second motors 64 and 66, an encoder 68, a code reading camera 70 and a start button 63. As illustrated, web 40 is fed from downwind reel 15 around roller 44, between rollers 44 and 46 and then to upwind reel 21 so that, as reel 15 is unwound, the web 40 travels along the directions indicated by arrows 80, 78 and 76.

Encoder 68 and associated rollers 44 and 46 are similar to the encoder and rollers described above with respect to FIG. 1 and therefore will not again be described in detail. Here, it should suffice to say that encoder signals are provided to processor 48 indicating roller 46 rotational velocity. As illustrated, rollers 44 and 46 are spaced from upwind reel 21 so as to form an exposure space 35. As its label implies, space 35 is the area in which assembly 60 exposes web defects for repair (i.e., web 40 is stopped when a defect is exposed in space 35).

Motors 64 and 66 are mechanically coupled to reels 15 and 21, respectively, to control rotational velocity. Controller 62 is linked to each of motors 64 and 66 to control those motors in unison to unwind the paper web from reel 15 and to wind the paper web on reel 21 while keeping the web section between reels 15 and 21 taut. Start button 63 is linked to controller 62 and indicates when assembly 60 should advance web 40 to the next defect that occurs along the web length. Thus, after one defect is repaired, a system operator activates button 63 and assembly 60 advances web 40.

In addition, other controller operating parameters are selectable by a system operator. One selectable parameter is a normal operating speed or normal command speed value S* which indicates a normal unwinding speed in feet per minute. The normal speed S* is selected as a function of various assembly 60 parameters and typically will be in the range of 4,000 to 8,000 feet per minute. Hereinafter it will be assumed the normal or top speed is 6,000 feet per minute.

Code reading camera 70 is a high speed, high resolution line or area camera including a lens (e.g., 50 mm) positioned within exposure space 35 proximate (e.g., within 1 meter) the path traveled by the mark sequences and the defect marks adjacent lateral web edge 17. Camera 70 reads mark sequences and provides data associated with the sequences to processor 48. Importantly, camera 70 must be capable of sensing the short marks generated by the high speed marker device 24 while the web is moving past camera 70 at an extremely high rate. At a minimum camera 70 should be able to sense a five inch mark passing by at 4,000 feet per minute. In some cases camera 70 should be able to sense a one inch mark passing by at 8,000 feet per minute. In some cases camera 70 need only be able to identify the starting points of marks that are within a minimum distance (e.g., 2-3 inches). Known conventional cameras used with web mark systems are not capable of accurately sensing marks and spaces of the magnitudes described herein.

In FIG. 2, database 18 is labeled with the same number as the data base in FIG. 1 to emphasize that the data used by processor 48 is the same data stored by processor 16 regarding defect locations along web 40.

Referring still to FIG. 2, in addition to other processes that may be performed by processor 48, processor 48 performs two processes that are important in the context of the present invention. First, processor 48 decodes the mark sequences from camera 70 to determine the absolute web length locations of each mark sequence. In addition, to determine the precise location of points between mark sequences, processor 48 uses, in at least some embodiments, signals from encoder 68 to identify absolute locations between marks. Thus, for instance, if a mark sequence indicates that the beginning of the mark sequence (i.e., the starting point of the first mark in the sequence) is at 3,000 yards and processor 48 uses the encoder signals to determine that the web has moved 8 yards past the beginning of the first mark in the sequence, processor 48 identifies an absolute instantaneous web length location of 3,008 yards.

Second, processor 48 uses the information in database 18 to determine the web length locations of defects on web 40 and then overrides the normal command speed value S* to controller 62 to reduce reel unwinding speed and to eventually stop the unwinding process such that the next defect to occur along the web length is exposed within exposure space 35 for repair. To this end, processor 48 performs an algorithm which, based on system characteristics and instantaneous operating parameters, identifies substitute command speed signals to provide to controller 62. In at least one embodiment, the substitute command signals include a slow command signal, a crawl command signal, and a stop command signal.

The algorithms performed by processor 48 to determine at which web length location to override the normal command speed signal may take any of several different forms and therefore no specific form is described here in detail. Here, it should suffice to say that whatever algorithm is employed, because the mark sequences applied via the high speed printer are much closer together, accuracy is increased appreciably and the fudge factor required to facilitate an accurate stop on a next defect can be minimized thereby speeding up the overall web advancing process.

B. Exemplary Code

Referring again to FIG. 3, an exemplary web length section 40 is illustrated which includes an exemplary 13 mark sequence, the first and second of the 13 marks identified by labels M1 and M2 and the $12^{th}$ and $13^{th}$ marks identified by labels M12 and M13, respectively. In FIG. 3, an exemplary defect 44 corresponding to a dark spot is illustrated along with a corresponding exemplary defect mark DM. In addition, an inspection camera window 70' corresponding to exemplary camera 70 in FIG. 2 is illustrated to show that camera 70 is generally aligned along lateral web edge 17 and the path traveled by the mark sequences.

Figure 4:
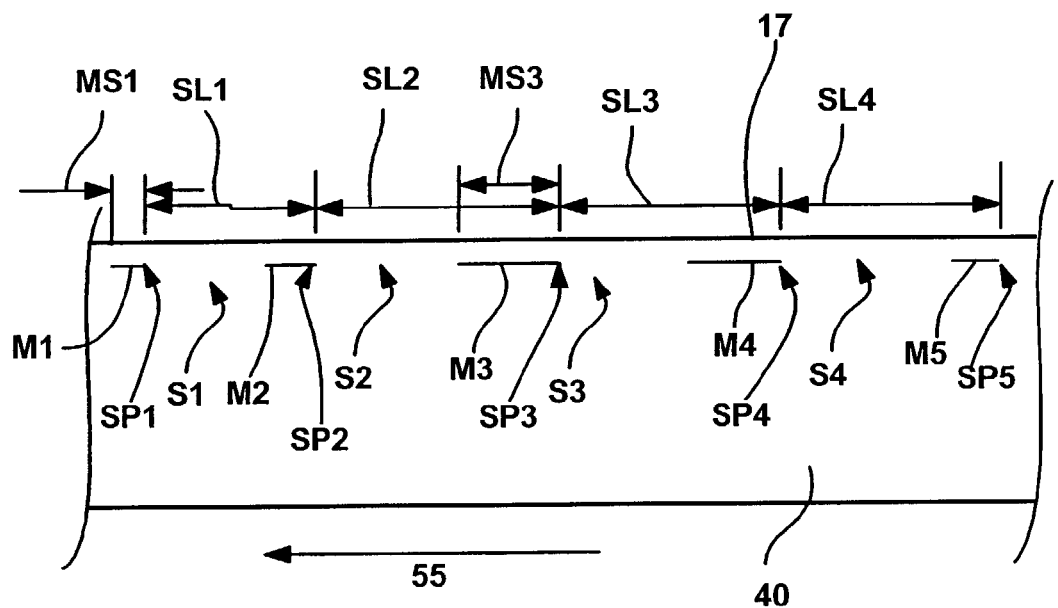
FIG. 4 is similar to FIG. 3, albeit illustrating a smaller segment of the web and a sub-set of marks from a sequence.

FIG. 4 is similar to FIG. 3, albeit illustrating a smaller set of marks (i.e., an incomplete mark sequence). In FIGS. 3 and 4, it is assumed web 40 travels in direction 55 from right to left during unwinding so that the left end of each mark (e.g., M1) is sensed first within window 70' followed by the right end. Note this order of sensing during unwinding is opposite the order in which each mark was generated. In other words, the starting points (i.e., where marker unit 24 in FIG. 1 was turned on to start the mark) of each mark (e.g., M1, M2, etc.) are at the right ends of each mark and the mark tails are at the left ends as illustrated in FIGS. 3 and 4. For instance, mark M1 starts at starting point SP1, mark M2 starts at starting point SP2 and so on.

While each mark sequence includes 13 separate marks in the illustrated example, the lengths of the marks may be different. For instance, in FIG. 4, mark M1 is characterized by a mark length MS1 that is clearly shorter than mark length MS3 corresponding to mark M3. Similarly, the spaces between marks in the inventive mark sequence have different lengths. For instance, space S4 between the starting points SP4 and SP5 of marks M4 and M5 is greater than space S1 between the starting points SP1 and SP2 of marks M1 and M2. The differences in mark lengths illustrated are not intended to show desired differences but rather to illustrate the occurrence of differently sized marks due to inability to precisely control mark lengths. Thus, in FIGS. 3 and 4 the intent may have been to apply marks having identical lengths but inability to precisely turn off the marker device 24 may have resulted in the disparate lengths.

It has been recognized that, while the length of a mark is difficult to control due to run-on problems with maker devices like device 24 in FIG. 1, the starting point of each mark (i.e., the instant at which a mark starts) is relatively precisely controllable. Thus, according to at least one aspect of the present invention, instead of using mark lengths to encode web length location data, the spaces between the starting points of marks are used to encode web length location. For example, in FIG. 4, mark M1 begins at starting point SP1 while the following mark M2 begins at starting point SP2. A space SL1 which is precisely controllable is formed between starting points SP1 and SP2. Thus, precise space length SL1 between starting points SP1 and SP2 can be used to code specific location data. Similarly, referring still to FIG. 4, mark M3 begins at starting point SP3 and starting points SP2 and SP3 can be precisely controlled to provide second space length SL2 and hence to code information, starting points SP3 and SP4 can be controlled to define space length SL3, starting points SP4 and SP5 can be controlled to define space length SL4, and so on. Although not labeled in the figures, the 13 separate marks M1 through M13 that define a single mark sequence can be used to precisely define 12 separate space lengths between consecutive starting points (see 12 spaces defined by marks in FIG. 3).

It has also been recognized that each space can be used to code different binary values such that, when a mark sequence is considered as a whole, the number of distinctly codable web locations is on the order of several hundred thousand. For instance, referring still to FIG. 4, in the illustrated embodiment of the present invention, four distinct space lengths are definable by adjacent mark pairs including 4, 5, 6 and 7 unit lengths SL1, SL2, SL3 and SL4, respectively. Hereinafter it will be assumed the units are inches. Because any of the spaces defined by adjacent mark pairs may be found to have any of four different values, each space within a mark sequence corresponds to two bits of information. Therefore, the 12 spaces in an exemplary mark sequence, when combined, can be used to generate 24 bits of information and well over 200,000 distinct web length location codes. This large number of distinct markings reduces reliance on encoder data to determine web length location and hence increases speed and precision of the stopping process.

In addition to providing a huge number of specific and distinct location codes, other features of the inventive mark sequence concept are contemplated that add additional value. First, unlike other web coding algorithms, with the present code, a small number (e.g., 4 space lengths) of space lengths may be used as an error checking or correcting code (e.g., a cyclic redundancy check (CRC)) to make sure that a location determination by processor 48 is correct. Where the CRC indicates data that is inconsistent with a corresponding location, the location determination can be corrected or discarded.

Second, by limiting the different space lengths (e.g., SL1, SL2, etc.) by marker device 24 to within certain ranges, even where marking errors occur, processor 48 can identify the mark sequence errors. For instance, consistent with the example above where maximum and minimum space lengths SL1 and SL4 are 4 and 7 inches, respectively, if marker device 24 fails to generate one of the 11 marks M2 through M12 in a 13 mark sequence, a corresponding space between starting points will be at least 8 inches and hence easily recognizable as a space in which a mark was missed. Similarly, if a sequence includes all 13 intended marks but one mark is not sensed by processor 48, processor 48 may recognize a space that is 8 or more inches long as a missed mark. Here, the important limitation is that the longest recognizable space length (e.g., SL4 above) should be less than twice the shortest space length (e.g., SL1 above). Where space lengths are specified in ranges, the upper limit for the longest space length should be less than twice the lower limit for the shortest space length. For instance, if length SL1 may be between 3.75 and 4.25 inches, the upper limit for the longest space length SL4 range should be less than 7.5 inches (e.g., less than 2×3.75 inches).

Third, by limiting the number of distinct space lengths used, many mismarking or misreading errors can be corrected by processor 48. For instance, again assuming mark lengths of 4, 5, 6 and 7 inches, where a second mark that was to be provided between first and third marks was either not applied by device 24 or was not sensed by camera 70, the space defined by the first and third marks is often useable to identify the location of the missing second mark. For instance, if the first and third marks define an 8 inch space, processor 48 can determine that the first and second marks and the second and third marks were to have defined two consecutive four inch space lengths as there is no other combination of 4, 5, 6 and 7 inch marks that make up an 8 inch mark. Similarly, if the first and third marks define a fourteen inch space, processor 48 can determine that the first through third marks were to have defined two consecutive 7 inch marks. Thus, here, to reduce the number of errors that may occur and result in similar erroneous space lengths, the number of distinct lengths employed should be small and the shortest employed length should not be extremely small. For instance, while some embodiments may include distinct space lengths on the order of one or two inches, 4 units or inches has been determined to be a good balance between competing considerations.

The mark length may be any dimension that fits certain criteria. Specifically, the mark length plus a maximum mark tail (MMT) (e.g., the maximum distance that a mark is expected to dribble on after marker device 24 is commanded to stop applying a mark) must be less than the minimum space length SL1. For instance, where the minimum space length SL1 is four inches, the mark and MMT combined may be up to a length less than 4 inches. It has been determined that a one inch long mark is easily readable via a typical code reading camera 70. Thus, where space length SL1 is four inches, the MMT must be just less than 3 inches.

In addition to reducing reliance on encoder data to determine inter-mark location, providing marks every few yards facilitates rapid re-synchronization after a web break occurs.

For instance, where mark sequences are 10 yards apart, when a break occurs, re-synchronization may be performed within 10 yards. Rapid re-synchronization within a short web length means essentially all defects can be exposed and repaired as quickly as possible.

Moreover, because the dimensions of the marks contemplated by the present invention are extremely small (e.g., $\frac{1}{50}^{th} \times \frac{1}{2}$ inch), the sequence lengths are reduced appreciably. Thus an exemplary sequence may be 4 or less yards instead of 30 or more yards as in the prior art. Reduced sequence length means a reduction in required ink, system maintenance, etc.

C. Exemplary Methods

Figure 5:
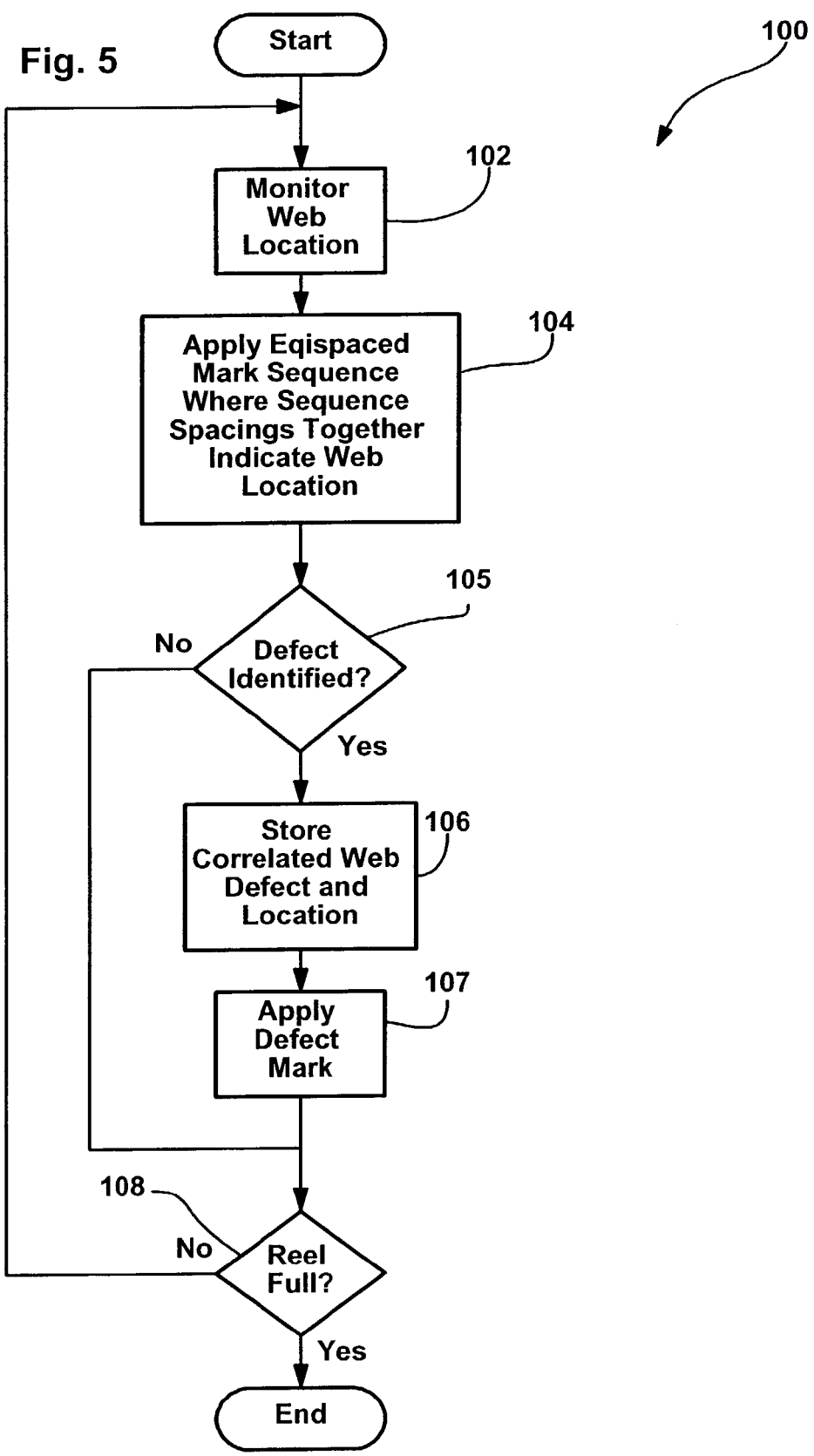
FIG. 5 is a flow chart illustrating one method according to the present invention.

Referring now to FIG. 5, one method 100 according to the present invention is illustrated. Referring also again to FIG. 1, at block 102, with web 40 output at port 32, processor 16 monitors web location with signals from encoder 20. At block 105, processor 16 causes marker device 24 to apply equispaced (e.g., every 10 yards) mark sequences that indicate web locations as described above. At block 104 processor 16 identifies any defect in the web. Where no defect is identified, control passes to block 108. At block 108, if the reel is full the process is halted and if the reel is not full, control passes back up to block 102 where the process is repeated. Referring again to block 105, where a defect is identified control passes to block 106 where processor 16 stores a correlated web location/defect pair. Next, control passes to block 107 where processor 15 controls marker device 24 to apply a defect mark laterally adjacent the defect after which control passes to block 108.

Figure 6:
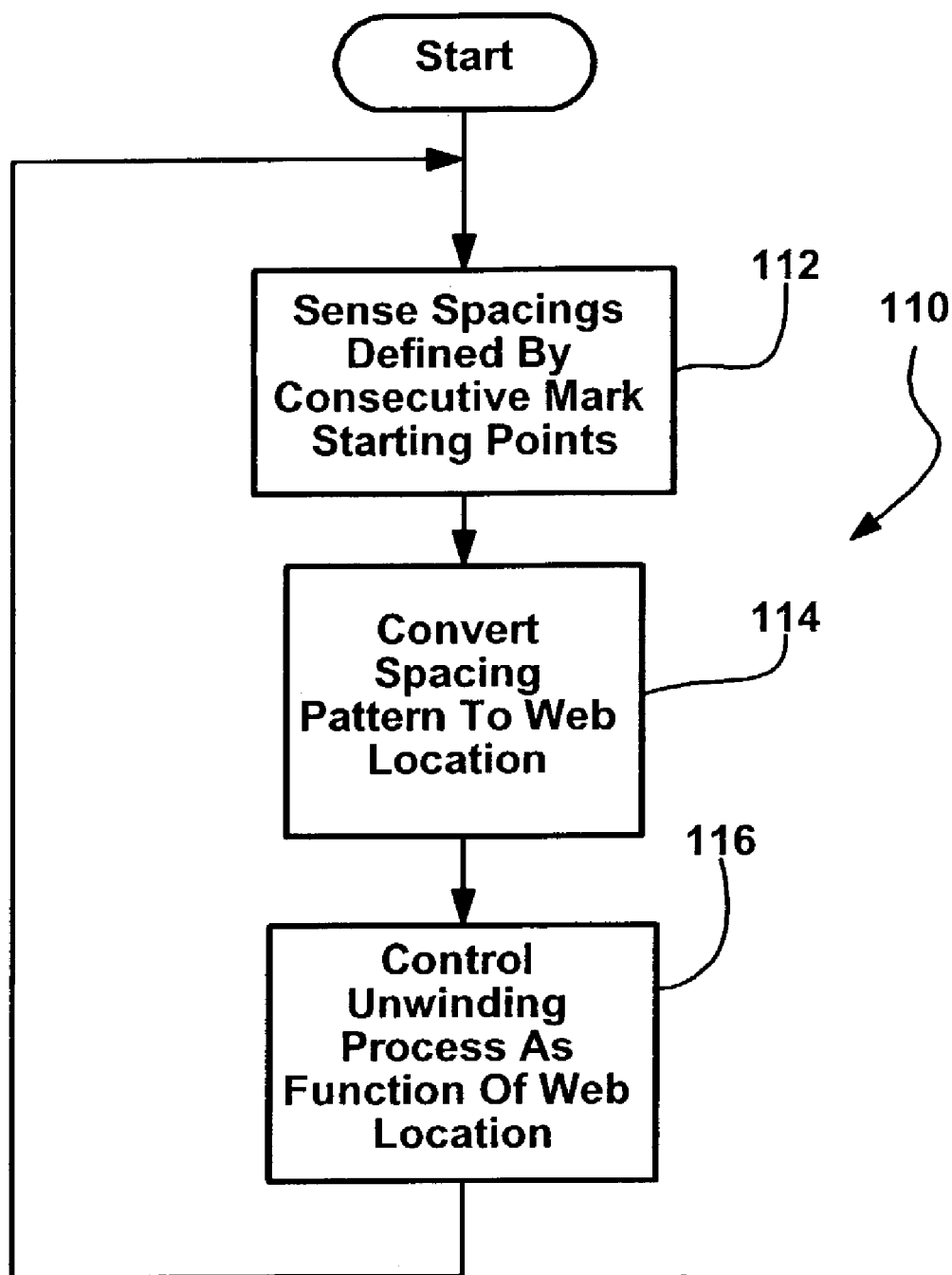
FIG. 6 is a flow chart illustrating a second method according to the present invention.

Referring now to FIG. 6, a method 110 for unwinding a web on reel 15 where the web includes mark sequences is illustrated. Referring also and again to FIG. 2, at block 112, processor 48 receives data from camera 70 corresponding to the web sequences and identifies the sequence spacings defined by the starting points of the marks. At block 114, processor 48 converts a sensed sequence spacing pattern to a web location and at block 116 processor 48 controls the unwinding process as a function of the web location. After block 116 control passes back up to block 112 where the process is repeated.

Figure 7:
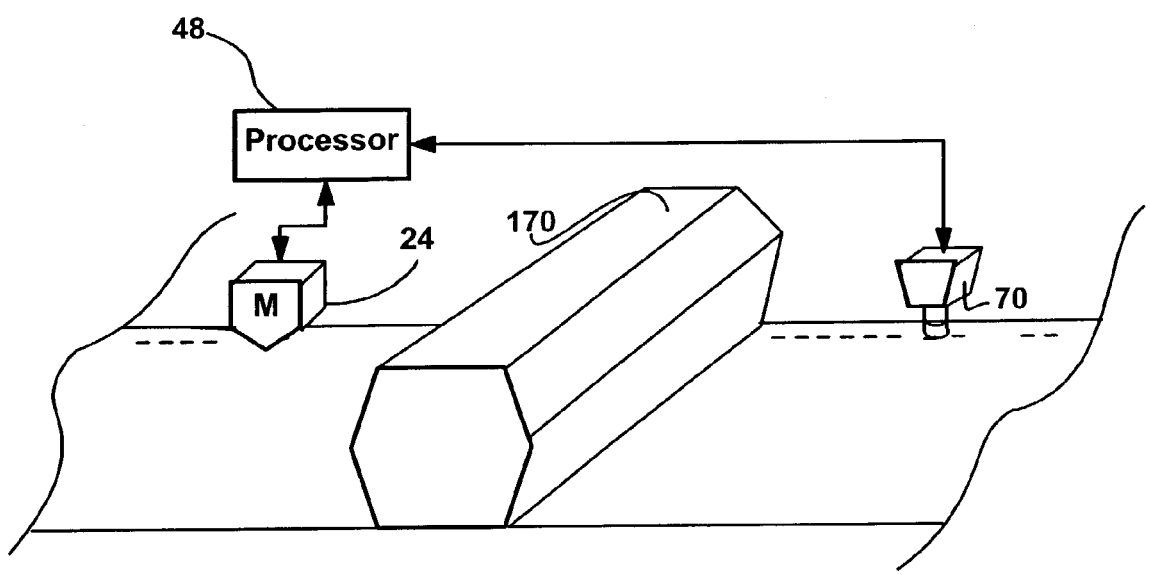
FIG. 7 is a schematic illustrating another configuration according to the present invention.

It is contemplated that under certain circumstances marks placed on a web during a marking process may subsequently become obscured. For instance, some post-marking processes may print over existing marks, may trim web edge and mark sequences thereon or may otherwise obscure the mark sequences. In this case, where a process is known to obscure mark sequences, it is contemplated that a re-marking configuration may be employed wherein a second marker (e.g., 24 in FIG. 1) may be used to remark a web within the same reference frame as the original mark sequences. To this end, referring to FIG. 7, an exemplary system including a component 170 that performs a process on a previously marked web is illustrated where a processor 48 is linked to a camera 70 and a marker unit 24. In the illustrated configuration it is assumed that component 170 alters the web in some fashion that renders the previously applied mark sequences obstructed (e.g., trimming, printing over, etc.). As illustrated, camera 70 is placed upstream of component 170 and marker unit 24 is placed downstream. Here, processor 48 obtains mark sequences via camera 70 and identifies absolute position or web location. In addition, processor is programmed to know the distance between camera 70 and unit 24 and to re-apply the mark sequences obtained via camera 70 to the web downstream at the exact same locations via unit 24.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims. For example, while a mark sequence protocol based on spaces formed by consecutive marks is described above, some embodiments may simply use a sequence protocol based on mark lengths as opposed to space length where novelty resided in the hardware configuration used to provide short and minimal ink marks (e.g., high speed cameras and marker devices). As another example, the protocol based on spaces as opposed to marks may be used with conventional marking devices, albeit a lot of the advantages associated with the high speed hardware may be minimized. As another example, while the invention is described above in the context of a system for identifying locations of defects via mark sequences, it should be appreciated that the invention has many other applications including any type of application where web location is to be determined or where a range of locations must be determined. In this regard the invention provides a common down-web coordinate system for recording event positions/ranges and, in at least some embodiments, subsequently taking actions based on those events. The events could include almost anything from optical detection of a defect, a process change, an operator-defined "region of interest", detection of metal by a scanning device, a region where a solvent was added, shift change boundaries, etc. Any piece of information that can be associated (in a database) with a down-web location (or range of locations) can later be identified and acted on. The later-processing machines could be almost any type of machine including machines used to process, convert, enhance, transport, analyze, view or repair web material. Also, the actions taken could include almost any type of action including slowing, stopping, alerting an operator, controlling a shear (cutter), activating safety devices, triggering a camera, lifting coater blades, etc.

In addition, while the specification above describes absolute position marking and determination it should be appreciated that there are many different ways to mark absolute position. For instance, the mark sequences themselves may indicate a specific number associated with an absolute position such as the number 1010 for 1010 yards or, in the alternative, some type of look up table may be provided for correlating the content of a sequence with a specific location (e.g., the number 47 may be correlated with 1010 yards, the number 12 may be correlated with 1110 yards and so on). Thus, the phrase absolute position is used in a broad sense.

Moreover, while the inventive space based mark sequence described above is described as being useable to mark web locations, it should be appreciated that the inventive sequence may be used for other marking purposes. For example a space-oriented mark sequence may be used to encode a reel ID number, in addition to or instead of the position code.

Furthermore, the mark sequences do not have to be uniformly spaced. Sequences could be provided with almost any changing frequency (e.g., more frequently at the beginning of a reel) or even random frequency.

To apprise the public of the scope of this invention, the following claims are made:

What is claimed is:

1. A method for use with a web of material having a web length dimension and a web surface, the method for placing mark sequences on the web surface every X distance along the web length dimension identifying location along the web length dimension wherein each mark includes a start point, the method comprising the steps of:
   monitoring web location;
   every X distance, placing a sequence of N marks on the web surface and spaced apart along the web length wherein each mark includes a start point and extends from the start point toward a next consecutive mark along the web length wherein the start points of each two adjacent marks define a space length dimension and wherein a pattern of space length dimensions formed by the N marks in the sequence together specify a specific web length location; and
   subsequent to placing a sequence, identifying the space length dimension pattern corresponding to the sequence.

2. The method of claim 1 wherein N is at least two.

3. The method of claim 1 wherein the ratio of the longest to the shortest space length dimensions is less than two.

4. The method of claim 3 wherein each space length dimension is a space dimension range and wherein the space dimension ranges are completely distinct.

5. The method of claim 4 wherein N is 13 and wherein the adjacent marks define twelve separate space length dimensions.

6. The method of claim 4 wherein the space dimension ranges include four separate space dimension ranges and each space dimension range indicates two bits of information.

7. The method of claim 6 wherein the highest value of the longest space dimension range is less than twice the lowest value of the shortest space dimension range.

8. The method of claim 7 wherein the space dimension ranges include first, second, third and fourth ranges between approximately 3.75 and 4.25 inches, 4.75 and 5.25 inches, 5.75 and 6.25 inches and 6.75 and 7.25 inches, respectively.

9. The method of claim 1 wherein each mark is between $\frac{1}{50}^{th}$ inch and five inches and each space length dimension is greater than the longest mark length dimension.

10. The method of claim 9 wherein each mark is between one inch and 2 inches and wherein each space length dimension is between 3 inches and 8 inches.

11. The method of claim 1 wherein each mark sequence is less than 5 yards.

12. The method of claim 1 wherein X is less than 100 yards.

13. The method of claim 1 wherein each mark is between $\frac{1}{50}^{th}$ and $\frac{1}{4}^{th}$ of an inch wide.

14. The method of claim 1 also for, subsequent to placing mark sequences on the web surface, identifying locations along the web surface via the mark sequences, the step of identifying the space length dimension patter further including the step of, while unwinding the web, examining the mark sequences and, for each sequence, identifying the space length dimension pattern corresponding to the sequence, the method further including the step of using the space length dimension pattern to determine location along the web length.

15. The method of claim 14 wherein the step of placing the marks includes using a high speed printer to place the marks and the step of examining the mark sequences includes providing a high speed, high resolution camera to sense the marks.

16. The method of claim 15 wherein the high speed printer is one of a laser marker and an ink jet printer.

17. The method of claim 1 also for storing locations of defects along the web length, the method further including the steps of:
   examining the web surface for defects; and
   when a defect is identified, storing an indication of the location of the defect in a database.

18. A method for use with a web of material having a web length dimension and a web surface, the method for placing marks on the web surface identifying location along the web length dimension wherein each mark includes a start point, the method comprising the steps of:
   providing a printer capable of generating at least 1000 separate marks per minute;
   moving the web material past a marking station at a rate of at least 500 feet per minute;
   monitoring web length location; and
   using the printer to place mark sequences along the length of the web that indicate associated web locations, wherein each sequence includes N marks spaced apart along the web length, each mark includes a start point and extends from the start point toward a next consecutive mark along the web length the start points of each two adjacent marks in a sequence define a space length dimension and a pattern of space length dimensions formed by the N marks in a sequence together specify a specific web length location; and
   subsequent to marking a sequence, identifying the space length dimension pattern corresponding to the sequence.

19. The method of claim 18 wherein the step of using the printer includes placing a sequence every X distance where each sequence includes N marks and each sequence is less than twenty yards long.

20. The method of claim 19 wherein each mark sequence is less than five yards long and X is less than 100 yards.

21. The method of claim 18 also for, subsequent to placing mark sequences on the web surface, identifying locations along the web surface via the mark sequences, the method further including the steps of:
   providing a high speed, high resolution camera proximate an inspection station;
   while unwinding the web, using the camera to examine the marks; and
   using the marks to determine location along the web length.

22. The method of claim 18 wherein the step of providing includes providing a printer capable of generating at least 1500 separate marks per minute.

23. The method of claim 22 wherein the step of providing includes providing a printer capable of generating at least 3000 separate marks per minute.

24. An apparatus for use with a web of material having a web length dimension and a web surface, the apparatus for placing mark sequences on the web surface every X distance along the web length dimension identifying location along the web length dimension wherein each mark includes a start point, the apparatus comprising:
   a processor for monitoring web location; and
   a high speed printer for, every X distance, placing a sequence of N marks on the web surface and spaced apart along the web length wherein each mark includes a start point and extends from the start point toward a next consecutive mark along the web length, the start points of each two adjacent marks define a space length dimension and wherein a pattern of space length dimensions formed by the N marks in the sequence together specify a specific web length location;

a camera for examining the mark sequences; and a processor for, for each sequence, identifying the space length dimension pattern corresponding to the sequence.

25. The apparatus of claim 24 wherein the ratio of the longest to the shortest space length dimensions is less than two.

26. The apparatus of claim 24 wherein each mark is between 1/50$^{th}$ inch and five inches and each space length dimension is greater than the longest mark length dimension.

27. The apparatus of claim 24 wherein X is less than 100 yards.

28. The apparatus of claim 24 also for, subsequent to placing mark sequences on the web surface, identifying locations along the web surface via the mark sequences, the processor using the space length dimension pattern to determine location along the web length.

29. The apparatus of claim 28 wherein the printer is one of an ink jet printer and a laser marker and the camera is a high speed high resolution camera.

30. An apparatus for use with a web of material having a web length dimension and a web surface, the apparatus for placing marks on the web surface identifying location along the web length dimension wherein each mark includes a start point, the apparatus comprising:

a web system for moving the web material past a marking station at a rate of at least 500 feet per minute;

a processor monitoring web length location;

a high speed printer capable of generating at least 1000 separate marks per minute, the printer juxtaposed proximate the marking station for placing marks on the web surface that form sequences useable subsequently to determine web location, wherein the printer is used to place mark sequences along the length of the web that indicate associated web locations and that can be used subsequently to identify specific locations on the web wherein each sequence includes N marks spaced apart along the length of the web, each mark includes a start point and extends from the start point toward a next consecutive mark along the web length, the start points of each two adjacent marks in a sequence define a space length dimension and a pattern of space length dimensions formed by the N marks in a sequence together specify a specific web length location;

a camera for examining the mark sequences; and a processor for, for each sequence, identifying the space length dimension pattern corresponding to the sequence.

31. The apparatus of claim 30 wherein each sequence is less than ten yards long, each mark is less than one foot long and X is less than fifty yards.

32. The apparatus of claim 31 also for, subsequent to placing mark sequences on the web surface, identifying locations along the web surface via the mark sequences, the apparatus further including the steps of:

unwinding the web at a rate of at least 500 feet per minute;

examining the mark sequences during unwinding; and for each sequence, using the sequence to determine location along the web length.

* * * * *